(12) United States Patent
Satou et al.

(10) Patent No.: US 9,525,329 B2
(45) Date of Patent: Dec. 20, 2016

(54) LINEAR ACTUATOR

(71) Applicant: KAYABA INDUSTRY CO., LTD., Tokyo (JP)

(72) Inventors: Kousuke Satou, Kanagawa (JP); Noriyuki Takahashi, Kanagawa (JP)

(73) Assignee: KYB Corporation, Tokyo (JP)

( * ) Notice: Subject to any disclaimer, the term of this patent is extended or adjusted under 35 U.S.C. 154(b) by 268 days.

(21) Appl. No.: 14/374,045

(22) PCT Filed: Jul. 9, 2013

(86) PCT No.: PCT/JP2013/068766
§ 371 (c)(1),
(2) Date: Jul. 23, 2014

(87) PCT Pub. No.: WO2014/017292
PCT Pub. Date: Jan. 30, 2014

(65) Prior Publication Data
US 2014/0339926 A1    Nov. 20, 2014

(30) Foreign Application Priority Data

Jul. 25, 2012    (JP) .................................. 2012-164715

(51) Int. Cl.
*H02K 41/02*    (2006.01)
*H02K 41/03*    (2006.01)

(52) U.S. Cl.
CPC ............ *H02K 41/02* (2013.01); *H02K 41/031* (2013.01); *H02K 2207/03* (2013.01)

(58) Field of Classification Search
CPC ........ H02K 7/08; H02K 41/031; H02K 41/02; H02K 2207/03
(Continued)

(56) References Cited

U.S. PATENT DOCUMENTS 5,263,558 A * 11/1993 Yamaoka ........... B60G 17/0157
188/267
7,913,822 B2 * 3/2011 Haney .................. B60G 17/019
188/266.1
(Continued)

FOREIGN PATENT DOCUMENTS

EP    2621066 A1    7/2013
JP    2004-357464 A    12/2004
(Continued)

OTHER PUBLICATIONS

Extended European Search Report dated Oct. 23, 2015.

*Primary Examiner* — Thanh Lam
(74) *Attorney, Agent, or Firm* — Rabin & Berdo, P.C.

(57) ABSTRACT

A linear actuator that is configured such that a first tube and a second tube are relatively displaced in an axial direction, includes a rod that is provided in the first tube and whose one end is fixed to an end portion of the first tube, a plurality of permanent magnets that are held by the rod so as to be arranged in the axial direction, and a tubular coil holder that is provided in the second tube and holds a coil that faces the permanent magnets, wherein the first tube has a first linear guide portion with a cylindrical surface that extends in the axial direction around the coil holder, and the second tube has a second linear guide portion with a cylindrical surface that is faced to the first linear guide portion without a gap therebetween so as to be slidably fitted therewith.

4 Claims, 2 Drawing Sheets

(58) Field of Classification Search
USPC .......... 310/12.01, 12.04, 12.33, 12.09, 12.31
See application file for complete search history.

(56) References Cited

U.S. PATENT DOCUMENTS

| | | | |
|---|---|---|---|
| 9,197,120 B2* | 11/2015 | Kakiuchi | H02K 11/215 |
| 2006/0181158 A1* | 8/2006 | Tajima | B60G 17/0157 |
| | | | 310/12.04 |
| 2008/0079522 A1* | 4/2008 | Okada | H02K 41/031 |
| | | | 335/229 |
| 2013/0175887 A1 | 7/2013 | Kakiuchi et al. | |

FOREIGN PATENT DOCUMENTS

| | | |
|---|---|---|
| JP | 2005-106242 A | 4/2005 |
| JP | 2007-274820 A | 10/2007 |
| JP | 2008-236832 A | 10/2008 |
| JP | 2010-104089 A | 5/2010 |
| JP | 2010-130805 A | 6/2010 |
| JP | 2012-070466 A | 4/2012 |
| WO | WO 2012-039293 A1 | 3/2012 |

* cited by examiner

LINEAR ACTUATOR

TECHNICAL FIELD

The present invention relates to a linear actuator that is extended/contracted in the axial direction by an electromagnetic force.

BACKGROUND ART

JP2005-106242A and JP2004-357464A disclose a linear actuator in which a first tube and a second tube are relatively displaced in the axial direction by an electromagnetic force generated between permanent magnets provided in the first tube and coils provided in the second tube.

SUMMARY OF INVENTION

With the linear actuator described in JP2005-106242A, because the permanent magnets and the coils are fixed to the shaft and a case supporting a lateral load, respectively, the distortion of the shaft and the case is easily propagated to the permanent magnets and the coils, and the permanent magnets and the coils may be damaged.

With the linear actuator described in JP2004-357464A, because a space is formed between a tubular rod and an outside yoke supporting a lateral load, the heat generated in the coils is not easily transferred from the tubular rod to the outside yoke due to the space, and the heat release from the coils may not be achieved sufficiently.

An object of the present invention is to provide a linear actuator that is capable of preventing a coil and a permanent magnet from being damaged due to a lateral load and that is capable of achieving sufficient heat release from a coil.

According to one aspect of the present invention, a linear actuator that is configured such that a first tube and a second tube are relatively displaced in an axial direction, includes a rod that is provided in the first tube and whose one end is fixed to an end portion of the first tube, a plurality of permanent magnets that are held by the rod so as to be arranged in the axial direction, and a tubular coil holder that is provided in the second tube and holds a coil that faces the permanent magnets, wherein the first tube has a first linear guide portion with a cylindrical surface that extends in the axial direction around the coil holder, and the second tube has a second linear guide portion with a cylindrical surface that is faced to the first linear guide portion without a gap therebetween so as to be slidably fitted therewith.

DESCRIPTION OF EMBODIMENTS

Figure 1:
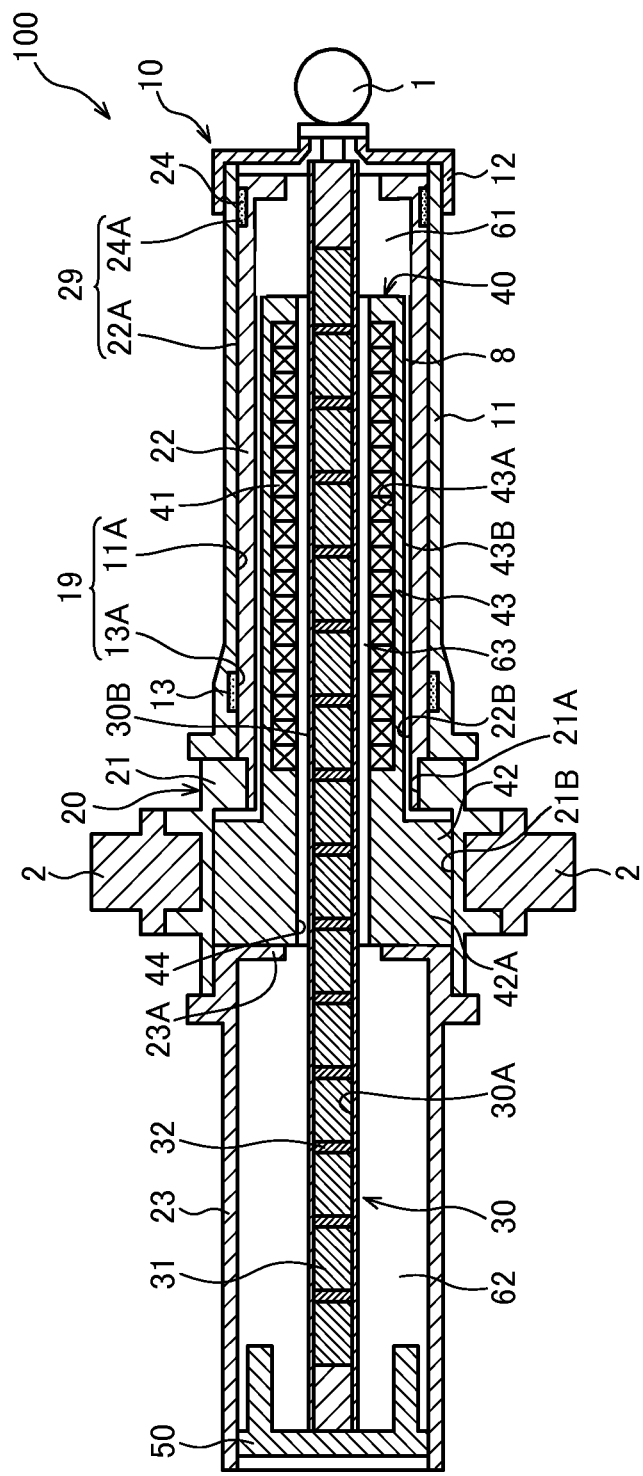
FIG. 1 is an axial cross section of a linear actuator according to an embodiment of the present invention and is a diagram showing the linear actuator in a fully contracted state.

A linear actuator 100 according to an embodiment of the present invention will be described with reference to FIGS. 1 and 2.

The linear actuator 100 is used as a vibration control actuator for suppressing vibration in, for example, automobiles, railroad vehicles, buildings, and so forth.

The linear actuator 100 includes a first tube 10, a second tube 20 that is slidably inserted into the first tube 10, a rod 30 that is fixed at the end portion of the first tube 10 and that holds permanent magnets 31, and a coil holder 40 that is provided so as to be fitted with the inside of the second tube 20 and that holds coils 41 facing the permanent magnets 31.

The linear actuator 100 is disposed between two members, which are relatively moved to each other, via a connecting portion 1 provided on the first tube 10 and connecting shafts 2 provided on the second tube 20.

In the linear actuator 100, a thrust (electromagnetic force) that drives the rod 30 in the axial direction is generated in accordance with the current flowing through the coils 41, and the first tube 10 and the second tube 20 are relatively displaced on the basis of the thrust. Thus, the linear actuator 100 extends/contracts between a fully contracted position shown in FIG. 1 and a fully extended position shown in FIG. 2.

The first tube 10 includes a cylindrical outer tube 11 having openings at both ends and a cap 12 that is connected at one end of the outer tube 11. The one end of the first tube 10 is closed by the cap 12 and the other end of the first tube 10 is formed as an open end. The connecting portion 1 is fixed on the outer-side surface of the cap 12.

The second tube 20 includes a cylindrical base portion 21, an inner tube 22 that is fixed at the one end side of the base portion 21, and a guide tube 23 that is fixed at the other end side of the base portion 21.

The base portion 21 is a tubular member having openings at both ends. A pair of connecting shafts 2 projecting in the radial directions are fixed on the outer circumference of the base portion 21. These connecting shafts 2 are provided at positions opposite to each other. The second tube 20 is connected via the connecting shafts 2 to the one of the two members, which are relatively moved to each other, and the first tube 10 is connected via the connecting portion 1 to the other of the two members, which are relatively moved.

The outer tube 11 and the inner tube 22 are tubular members having openings at both ends. The inner tube 22 is slidably inserted into the outer tube 11 in a state in which it is provided on the base portion 21. The one end of the inner tube 22 is fitted with and fixed to an inner circumferential surface 21A of the base portion 21, and thereby the inner tube 22 is supported at the one end thereof by the base portion 21.

The linear actuator 100 includes a first linear guide portion 19 and a second linear guide portion 29 with which the first tube 10 and the second tube 20 are supported in a relatively displaceable manner in the axial direction.

A first bearing 13 is provided on the inner circumference of the open end side of the outer tube 11 through which the inner tube 22 is inserted. A bearing surface (inner circumferential surface) 13A of the first bearing 13 is in sliding contact with an outer circumferential surface 22A of the inner tube 22. The first linear guide portion 19 consists of an inner circumferential surface 11A of the outer tube 11 and the bearing surface 13A of the first bearing 13.

A second bearing 24 is provided on the outer circumference of the free end of the inner tube 22. A bearing surface (outer circumferential surface) 24A of the second bearing 24 is in sliding contact with the inner circumferential surface 11A of the outer tube 11. The second linear guide portion 29 consists of the outer circumferential surface 22A of the inner tube 22 and the bearing surface 24A of the second bearing 24.

When the linear actuator 100 is extended/contracted, in the first linear guide portion 19 and the second linear guide portion 29, the bearing surface 13A of the first bearing 13 is in sliding contact with the outer circumferential surface 22A of the inner tube 22 and the bearing surface 24A of the second bearing 24 is in sliding contact with the inner circumferential surface 11A of the outer tube 11, thereby allowing smooth sliding between the outer tube 11 and the inner tube 22. The inner circumferential surface 11A of the outer tube 11 and the outer circumferential surface 22A of the inner tube 22 are faced to each other without a gap therebetween via the first bearing 13 and the second bearing 24. The first bearing 13 and the second bearing 24 are annular slide materials.

The configuration is not limited to that mentioned above, and a configuration in which the first bearing 13 is provided over the whole area of the inner circumference of the outer tube 11 and the second bearing 24 is not provided may be employed. In addition, a configuration in which the second bearing 24 is provided over the whole area of the outer circumferential surface of the inner tube 22 and the first bearing 13 is not provided may be employed.

The inner tube 22 is provided around the coil holder 40, and the outer tube 11 is displaced in the axial direction with respect to the inner tube 22. The first linear guide portion 19 of the outer tube 11 and the second linear guide portion 29 of the inner tube 22 are faced to each other without a gap therebetween around the coil holder 40 so as to be slidably fitted with each other. Accordingly, a heat transfer pathway is formed by the coil holder 40, and the inner tube 22 and the outer tube 11. The heat from the coils 41 is transferred by such a heat transfer pathway to the outside of the linear actuator 100.

The guide tube 23 is a tubular member having openings at both ends. A rod guide 50 that is fixed to the tip end of the rod 30 is slidably provided in the guide tube 23.

The rod 30 is a rod-shaped member having a hollow portion 30A. The one end of the rod 30 is fixed to the cap 12 forming the end portion of the first tube 10. In addition, the rod guide 50 mentioned above is fixed to the other end of the rod 30. By providing the rod guide 50 at the tip end of the rod 30, it is possible to prevent the tip-end portion of the rod 30 from swinging in the radial direction during the linear actuator 100 is extended/contracted.

In the hollow portion 30A of the rod 30, a plurality of permanent magnets 31 are held so as to be arranged along the axial direction. The permanent magnets 31 are formed to have a columnar shape and are magnetized to exhibit N poles and S poles in the axial direction. Adjacent permanent magnets 31 are arranged such that the same magnetic poles are faced to each other. In addition, yokes 32 are provided between the adjacent permanent magnets 31. The yokes 32 may not necessarily be provided, and respective permanent magnets 31 may be arranged so as to be directly adjacent to each other.

The coil holder 40 is a tubular member having a large-diameter portion 42 and a small-diameter portion 43. The large-diameter portion 42 is formed to have the outer diameter larger than that of the small-diameter portion 43. An outer circumferential surface 42A of the large-diameter portion 42 is fitted with and fixed to an inner circumferential surface 21B of the base portion 21, and thereby the coil holder 40 is supported at the one end thereof by the base portion 21. The inner circumferential surface 21B of the base portion 21 is formed to have the inner diameter larger than that of the inner circumferential surface 21A of the base portion 21.

An annular gap 8 is formed around the coil holder 40. The annular gap 8 is formed between an inner circumferential surface 22B of the inner tube 22 and an outer circumferential surface 43B of the small-diameter portion 43 of the coil holder 40. By providing the outer circumference of the coil holder 40 and the inner circumference of the inner tube 22 such that they are separated from each other in this manner, even if the outer tube 11 and the inner tube 22 are deflected when the linear actuator 100 is subjected to a lateral load, the occurrence of the stress on the coil holder 40 is suppressed.

The coil holder 40 has an insertion hole 44 through which the rod 30 is inserted in the axial direction. An annular depressed portion 43A is formed on the inner circumferential surface of the small-diameter portion 43 forming the insertion hole 44, and a plurality of coils 41 are fixed in the annular depressed portion 43A. The plurality of coils 41 are disposed side-by-side along the axial direction so as to face the permanent magnets 31.

The current supplied to the coils 41 is controlled by a controller, which is installed, for example, outside the linear actuator 100. The controller controls the intensity and the direction of the current that is supplied to the coils 41 on the basis of relative positional-information of the coils 41 and the permanent magnets 31 detected by a position sensor (not shown). By doing so, the level and the direction (extension/contraction direction) of the thrust generated by the linear actuator 100 are adjusted.

A position sensor is a Hall element that generates the Hall voltage corresponding to the strength of the magnetic field and is embedded in the large-diameter portion 42 of the coil holder 40.

In the linear actuator 100, when the current is supplied to the coils 41 in a predetermined direction, the thrust driving the rod 30 rightward in FIG. 1 is generated. As the rod 30 is driven rightward, the outer tube 11 of the first tube 10 is moved rightward while sliding with respect to the inner tube 22 of the second tube 20, and the linear actuator 100 is extended.

At the fixed end of the guide tube 23, a protruding portion 23A that protrudes inward is formed. When the linear actuator 100 is extended to the fully extended position (see FIG. 2), the rod guide 50 is brought into contact with the left-side surface of the protruding portion 23A, thereby restricting further movement of the rod 30. In this way, the rod guide 50 functions as a stopper.

Figure 2:
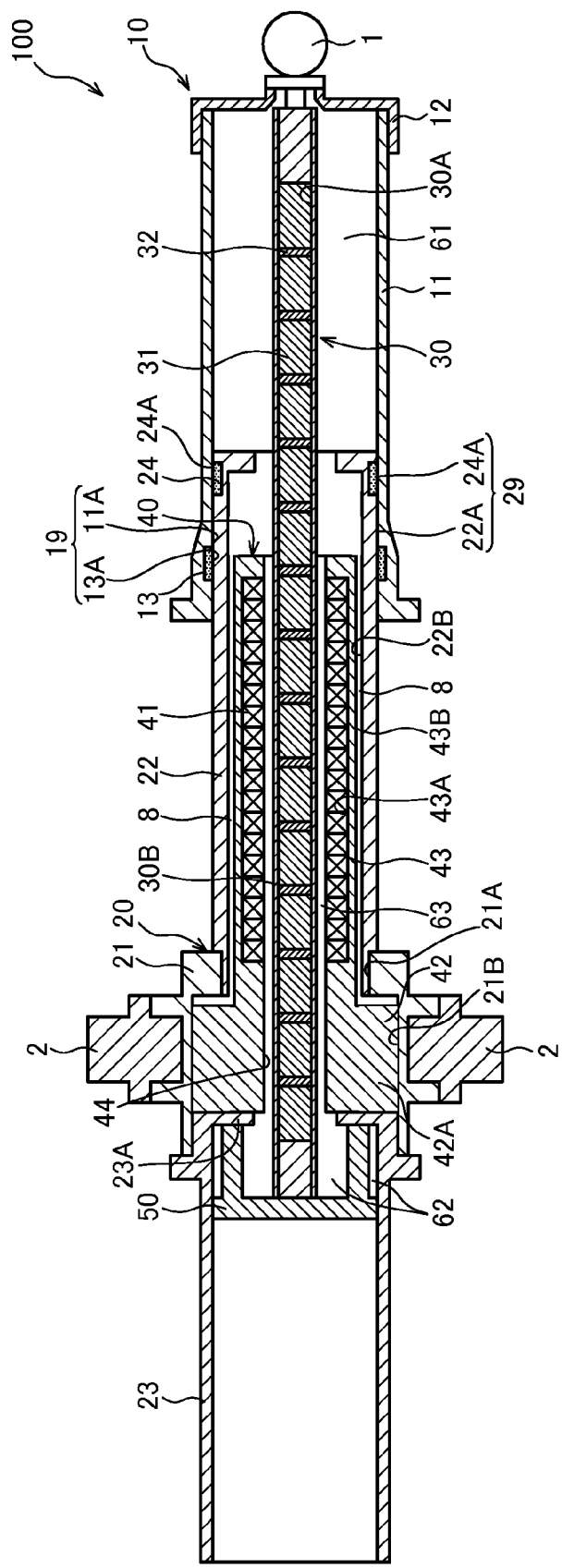
FIG. 2 is an axial cross section of a linear actuator according to an embodiment of the present invention and is a diagram showing the linear actuator in a fully extended state.

On the other hand, when the current is supplied to the coils 41 in the direction opposite to that during the extension, the thrust driving the rod 30 leftward in FIG. 2 is generated. As the rod 30 is driven leftward, the outer tube 11 of the first tube 10 is moved leftward while sliding with respect to the inner tube 22 of the second tube 20, and the linear actuator 100 is contracted.

When the linear actuator 100 is contracted to the fully contracted position (see FIG. 1), the open end of the outer tube 11 is brought into contact with the right end portion of the base portion 21, thereby restricting further movement of the rod 30. In this way, the open end of the outer tube 11 functions as a stopper.

As shown in FIG. 1, in the linear actuator 100, a first chamber 61 is defined as a space between the one end of the coil holder 40 and the cap 12 of the first tube 10, and a second chamber 62 is defined as a space between the other end of the coil holder 40 and the rod guide 50 that is provided in the guide tube 23.

The first chamber 61 communicates with the second chamber 62 through the insertion hole 44 of the coil holder 40. In other words, the first chamber 61 communicates with the second chamber 62 through an annular gap 63 that is formed between the inner circumference of the coil holder 40 forming the insertion hole 44 and an outer circumferential surface 30B of the rod 30.

When the linear actuator 100 is extended/contracted, because the first linear guide portion 19 and the second linear guide portion 29 are in sliding contact with each other, the first tube 10 and the second tube 20 are supported such that the relative displacement in the axial direction is allowed. Because a lateral load acting on the first tube 10 and the second tube 20 is supported with the sliding-contacting portion between the first linear guide portion 19 and the second linear guide portion 29, the occurrence of the stress on the rod 30 that is provided in the first tube 10 as a separate member is suppressed and the occurrence of the stress on the coil holder 40 that is provided in the second tube 20 as a separate member is suppressed.

Because the large-diameter portion 42 of the coil holder 40 is connected to the inner tube 22 via the base portion 21 and the annular gap 8 is formed between the small-diameter portion 43 of the coil holder 40 and the inner tube 22, even if the outer tube 11 and the inner tube 22 are deflected due to a lateral load, propagation of the distortion to the coil holder 40 is suppressed. Therefore, it is possible to prevent the coils 41 that are held in the coil holder 40 from being damaged.

Because the one end of the rod 30 is connected to the end portion of the outer tube 11 via the cap 12, and the annular gap 63 is formed between the outer circumferential surface 30B of the rod 30 and the inner circumference (the insertion hole 44) of the coil holder 40, even if the outer tube 11 and the inner tube 22 are deflected due to a lateral load, propagation of the distortion to the rod 30 is suppressed. Therefore, it is possible to prevent the permanent magnets 31 that are held in the rod 30 from being damaged.

When the linear actuator 100 is extended/contracted, the heat generated in the coils 41 is transferred to the coil holder 40, the inner tube 22, and the outer tube 11, and the heat is released to the outside air from the inner tube 22 and the outer tube 11.

In the above-mentioned heat transfer pathway, although the annular gap 8 forms a space between the coil holder 40 and the inner tube 22, by forming the annular gap 8 to have a small opening width, the heat transfer from the metallic coil holder 40 to the metallic inner tube 22 is sufficiently achieved.

In the above-mentioned heat transfer pathway, because the inner circumferential surface 11A of the outer tube 11 and the outer circumferential surface 22A of the inner tube 22 are faced to each other without a gap therebetween so as to be slidably fitted with each other, a space (annular gap) is not formed between the outer tube 11 and the inner tube 22. Therefore, the heat generated in the coils 41 is directly transferred from the metallic inner tube 22 to the metallic outer tube 11, thereby facilitating the heat release from the coils 41.

The outer tube 11 to which the rod 30 is connected is disposed at the outside of the inner tube 22 to which the coil holder 40 is connected. Therefore, as the linear actuator 100 is extended, a part of the inner tube 22 is exposed to the outside of the linear actuator 100 through a region between the outer tube 11 and the base portion 21, thereby facilitating the heat release to the outside air.

In contrast, when a configuration in which a first tubular member (corresponding to the outer tube 11) to which a rod is connected is disposed in a second tubular member (corresponding to the inner tube 22) to which a coil holder is connected is employed, as the linear actuator extends, a space is formed between the coil holder and the second tubular member, thus the heat releasing property of the coils may not to be superior.

With the linear actuator 100 according to this embodiment mentioned above, the following effects can be achieved.

In the linear actuator 100, the second tube 20 has the second linear guide portion 29 with a cylindrical surface extending in the axial direction around the coil holder 40, and the first tube 10 has the first linear guide portion 19 with a cylindrical surface that is faced to the second linear guide portion 29 without a gap therebetween so as to be slidably fitted therewith. Therefore, because a lateral load acting on the linear actuator 100 is supported with the sliding-contacting portion between the first linear guide portion 19 and the second linear guide portion 29, it is possible to suppress the occurrence of the stress on the rod 30 and the coil holder 40, which are respectively provided in the first tube 10 and the second tube 20 as separate members, and to prevent the coils 41 and the permanent magnets 31 from being damaged. The heat transfer pathway through which the heat from the coils 41 is transferred via the coil holder 40, the first tube 10, and the second tube 20 is formed, and thereby, it is possible to achieve the heat release from the coils 41 sufficiently.

In addition, the outer tube 11 (the first tube 10) is disposed outside the inner tube 22 (the second tube 20), the first linear guide portion 19 consists of the inner circumferential surface 11A of the outer tube 11, and the second linear guide portion 29 consists of the outer circumferential surface 22A of the inner tube 22. Therefore, as the linear actuator 100 is extended, because a part of the outer circumferential surface 22A of the inner tube 22 is exposed to the outside of the linear actuator 100 through a region between the outer tube 11 and a base member 21 and the heat release to the outside air is facilitated, it is possible to achieve the heat release from the coils 41 sufficiently.

In addition, with the linear actuator 100, the first linear guide portion 19 includes the bearing surface 13A of the first bearing 13 that is in sliding contact with the outer circumferential surface 22A of the inner tube 22, and the second linear guide portion 29 includes the bearing surface 24A of the second bearing 24 that is in sliding contact with the inner circumferential surface 11A of the outer tube 11. Therefore, the inner tube 22 smoothly slides on the outer tube 11.

In addition, with the linear actuator 100, because the annular gap 8 is formed between the inner circumference of the inner tube 22 and the outer circumference of the coil holder 40, even if the outer tube 11 and the inner tube 22 are deflected by receiving a lateral load, the occurrence of the stress on the coil holder 40 is suppressed. Therefore, it is possible to prevent the coils 41 held in the coil holder 40 from being damaged.

Embodiments of this invention were described above, but the above embodiments are merely examples of applications of this invention, and the technical scope of this invention is not limited to the specific constitutions of the above embodiments.

The configuration is not limited to that mentioned above, and a configuration in which the annular gap 8 is not formed between the inner circumference of the inner tube 22 and the outer circumference of the coil holder 40, and the inner circumference of the inner tube 22 is fitted with the outer circumference of the coil holder 40 without a gap therebetween may be employed in the linear actuator 100.

In this case, because the heat from the coils 41 is directly transferred, rather than via the space (the annular gap 8), from the coil holder 40 to the inner tube 22, the heat release from the coils 41 is facilitated. In addition, even if the outer tube 11 and the inner tube 22 are deflected due to a lateral load, the occurrence of the stress on the coil holder 40 is suppressed by the stiffness of the outer tube 11 and the inner tube 22. Therefore, it is possible to prevent the coils 41 held in the coil holder 40 from being damaged.

In addition, in the above-mentioned embodiment, a configuration in which the inner circumference of the first tube 10 (the outer tube 11) to which the rod 30 is connected is slidably fitted with the outer circumference of the second tube 20 (the inner tube 22) to which the coil holder 40 is connected has been employed; however, a configuration in which the inner circumference of the second tube 20 is slidably fitted with the outer circumference of the first tube 10 may still be employed.

This application claims priority based on Japanese Patent Application No. 2012-164715 filed with the Japan Patent Office on Jul. 25, 2012, the entire contents of which are incorporated into this specification.

The invention claimed is:

1. A linear actuator that is configured such that an outer tube and an inner tube are relatively displaced in an axial direction, comprising:
   a rod that is provided inside the outer tube and whose one end is fixed to an end portion of the outer tube;
   a plurality of permanent magnets that are held inside the rod so as to be arranged in the axial direction; and
   a tubular coil holder that is provided inside the inner tube and holds a coil that faces the permanent magnets the coil holder being relatively displaced with the inner tube with respect to the outer tube; wherein
   the outer tube has a first linear guide portion comprising an inner circumferential surface of the outer tube extending along the axial direction around the coil holder and a bearing surface of a first bearing provided on the inner circumferential surface of the outer tube,
   the inner tube has a second linear guide portion comprising an outer circumference surface of the inner tube and a bearing surface of the second bearing provided on the outer circumference surface of the inner tube, the outer circumference surface of the inner tube sliding with the bearing surface of the first bearing, the outer circumference surface of the inner tube being in proximity to the inner circumference surface of the outer tube, the bearing surface of the second bearing being faced to the inner circumference surface of the outer tube without a gap therebetween so as to slide therewith,
   the inner tube configured to be located inside of the outer tube and moveable with respect to the outer tube so that the outer circumference surface of the inner tube is exposed to the outside as the linear actuator is extended.

2. The linear actuator according to claim 1, wherein an annular gap is provided between an inner circumference of the inner tube and an outer circumference of the coil holder.

3. A linear actuator, comprising:
   an outer tube;
   an inner tube provided inside of the outer tube and configured to be relatively displaced in an axial direction relative to the outer tube;
   a rod provided inside the outer tube and having one end fixed to an end portion of the outer tube;
   a plurality of permanent magnets held inside the rod so as to be arranged in the axial direction; and
   a tubular coil holder provided inside the inner tube and holding a coil that faces the permanent magnets, the coil holder being relatively displaced with the inner tube with respect to the outer tube,
   wherein the outer tube has a first linear guide portion with a cylindrical surface that extends in the axial direction around the coil holder,
   the second tube has a second linear guide portion with a cylindrical surface that is faced to the first linear guide portion without a gap therebetween so as to be slidably fitted therewith,
   the first linear guide portion consists of an inner circumferential surface of the outer tube and a bearing surface of a first bearing that is faced to an outer circumferential surface of the inner tube without a gap therebetween so as to slide therewith,
   the second linear guide portion consists of the outer circumferential surface of the inner tube and a bearing surface of a second bearing that is faced to the inner circumferential surface of the outer tube without a gap therebetween so as to slide therewith,
   the outer tube has a first groove formed on the inner circumference surface thereof that slides with the second bearing sliding, the first bearing being housed in the first groove, and
   the inner tube has a second groove formed on the outer circumference surface thereof that slides the first bearing, the second bearing being housed in the second groove.

4. The linear actuator of claim 1, wherein the first linear guide portion of the outer tube is configured to be slideable fitted with the second linear guide portion of the inner tube so as to have no gap between the outer tube and the inner tube.

* * * * *